(12) United States Patent
Kale (10) Patent No.: US 11,631,241 B2
(45) Date of Patent: Apr. 18, 2023

(54) PAIRED OR GROUPED DRONES

(71) Applicant: Micron Technology, Inc., Boise, ID (US)

(72) Inventor: Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 360 days.

(21) Appl. No.: 16/843,753

(22) Filed: Apr. 8, 2020

(65) Prior Publication Data
US 2021/0319201 A1  Oct. 14, 2021

(51) Int. Cl.
| | |
|---|---|
| G06V 20/13 | (2022.01) |
| G06K 9/62 | (2022.01) |
| G06T 7/11 | (2017.01) |
| G06T 7/70 | (2017.01) |
| G06N 5/04 | (2023.01) |
| B64C 39/02 | (2023.01) |
| G05D 1/10 | (2006.01) |

(52) U.S. Cl.
CPC ............ *G06V 20/13* (2022.01); *B64C 39/024* (2013.01); *G05D 1/101* (2013.01); *G06K 9/6288* (2013.01); *G06N 5/04* (2013.01); *G06T 7/11* (2017.01); *G06T 7/70* (2017.01); *B64C 2201/127* (2013.01); *B64C 2201/141* (2013.01); *G06T 2207/10032* (2013.01); *G06T 2207/20084* (2013.01)

(58) Field of Classification Search
CPC ........ B64C 2201/127; B64C 2201/123; B64C 2201/126; B64C 2201/22; B64C 2201/143; B64C 2201/108; B64C 2201/14; G06T 2207/10032; G06T 2207/20081; G06T 7/0004; G06T 2207/30128; G06T 2207/10024; G06T 2207/10056; G06T 7/0008; G06T 7/62; G06T 7/90; G06T 3/40; G06T 7/0014; G06T 2207/10016; G06T 7/20; G06T 2207/30196; G06T 2207/30232; G06T 7/70; G06T 19/006; G06T 2207/20084; G06T 2207/30088; G06T 2207/30212
See application file for complete search history.

(56) References Cited

U.S. PATENT DOCUMENTS

| | | | |
|---|---|---|---|
| 2017/0264907 A1* | 9/2017 | Barre | B64C 39/024 |
| 2018/0075596 A1* | 3/2018 | Fryshman | A01M 1/22 |
| 2019/0051193 A1* | 2/2019 | Gutierrez | G05D 1/104 |
| 2019/0129006 A1* | 5/2019 | Harman | G01S 13/52 |

* cited by examiner

*Primary Examiner* — Alex Kok S Liew
(74) *Attorney, Agent, or Firm* — Greenberg Traurig LLP (57) ABSTRACT

Disclosed are methods, devices, and computer-readable media for operating paired or grouped drone devices. In one embodiment, a method is disclosed comprising capturing a first image by a camera installed on a first drone device; processing the first image using an artificial intelligence (AI) engine embedded in the first drone device, the processing comprising generating a first inference output; transmitting the first inference output to a second drone device; receiving a second inference output from the second drone device, the second inference output associated with a second image captured by the second drone device; and transmitting the first image to a processor based on the first inference output and second interference output.

15 Claims, 6 Drawing Sheets

PAIRED OR GROUPED DRONES

FIELD OF THE TECHNOLOGY

At least some embodiments disclosed herein relate generally to controlling drones and, specifically, for improving camera operations executed by multiple done devices.

BACKGROUND

One application of drone technology is the use of camera-equipped drones to capture aerial imagery of objects of interest. As a simple example, many drones can be equipped with cameras (still or video) to record images while the drones are in flight. Such cameras may be attached to an underside of the drone and may be configured to be programmatically adjustable to capture an area below and around the drone while in flight. Currently, such setups are used to capture images or video of the underlying landscape or other airborne objects of interest.

More recently, systems employing multiple cameras or multiple drones have been utilized. A multi-camera system generally equips a single drone with multiple cameras and allows the drone to capture multiple fields of view that may potentially overlap. A multi-drone system employs multiple drones with one or more cameras. These systems generally record images and feedback these images to a remote workstation. However, multi-drone or multi-camera systems record separate and distinct images and fail to provide a full stereoscopic image by combining separately captured images. The present disclosure provides methods, devices, systems, and computer-readable media to solve these and other problems in existing drone-based systems.

DETAILED DESCRIPTION

A small drone can have a "single-eyed" view of an area. Two or more drones can be paired into a group to improve the "vision" of the group. The images in each camera can be processed by built-in artificial intelligence (AI) engines to generate inference outputs that can be shared across relatively slow, over-the-air communication connections among the drones. The inference outputs allow the drones to selectively transmit image data for a fusion vision, and keep a formation for an optimized stereoscopic vision on an object of interest. As one example, once an object of interest is identified, the portions of images containing the object can be selected and communicated over the communication links for stereoscopic vision processing.

Many of the examples and embodiments described herein are describe or depict aerial drones; however, the disclosure is not limited to only aerial drones. As one example, mechanical, land-based drones may be used in similar manners to create stereoscopic images of an object of interest. Similarly, marine-based drones or spacecraft drones or probes may also be used in similar manners. Further, while described primarily in the context of recording "images," the disclosed embodiments may equally be applied to video-based recording systems, which, themselves, captured individual images as frames.

Figure 1:
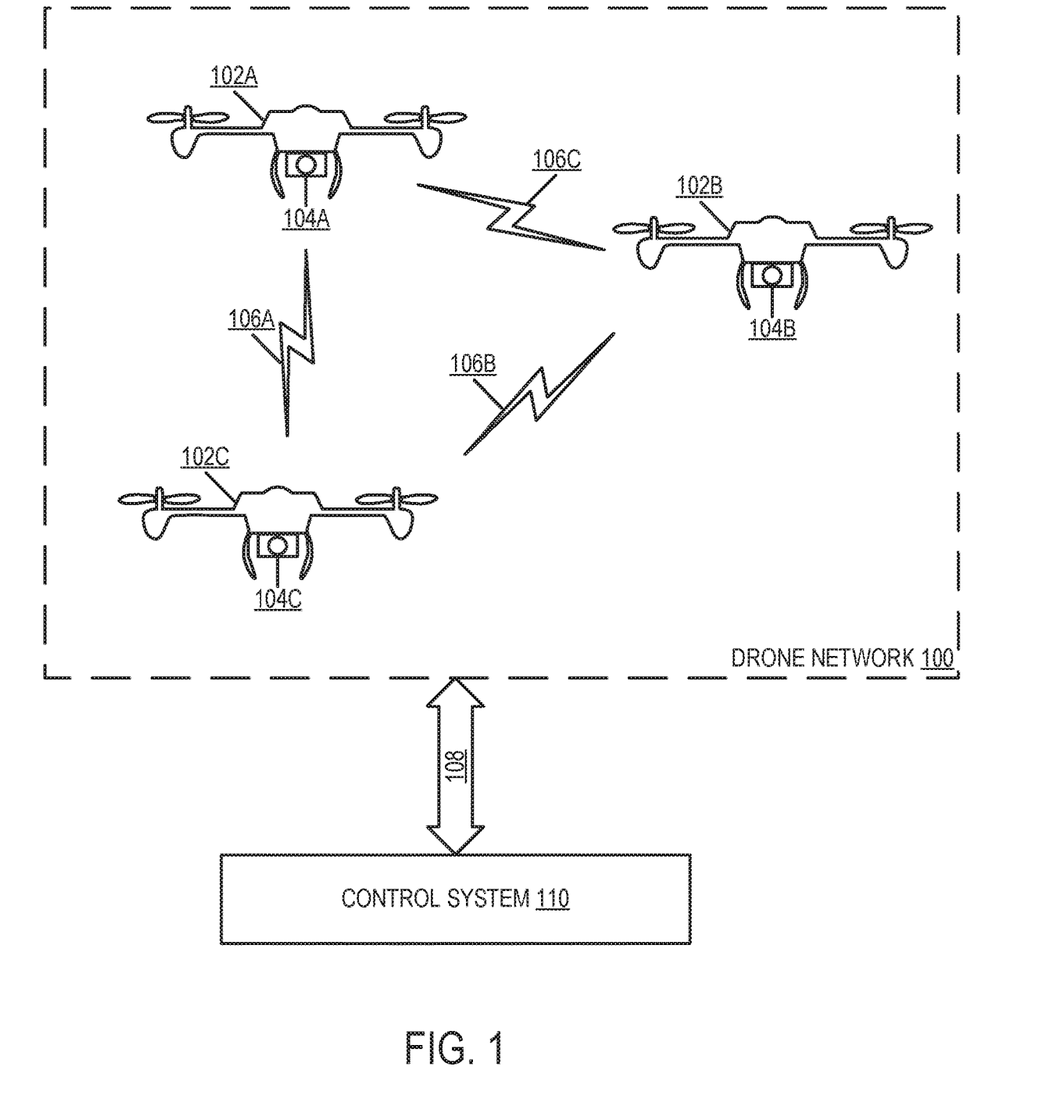
FIG. 1 is a system diagram illustrating a multi-drone deployment according to some embodiments of the disclosure.

FIG. 1 is a system diagram illustrating a multi-drone deployment according to some embodiments of the disclosure.

In the illustrated embodiment, drones (102a, 102b, 102c; collectively or representatively 102) are deployed to form a drone network (100). In the illustrated embodiment, the drones (102) comprise aerial drones, although land-based, sea-based, space-based, or other types of autonomous or non-piloted devices may be used. Each drone (102a, 102b, 102c) is equipped with inter alia camera devices (104a, 104b, 104c; collectively or representatively 104). In some embodiments, the camera devices (104) comprise still camera devices; in other embodiments, the camera devices (104) may comprise video recording devices. In yet other embodiments, the camera devices (104) may comprise infrared or other recording devices. In most embodiments, the camera devices (104) comprise digital recording devices, although the disclosure does not limit the particular technology used to implement the camera devices (104). Further detail on the internal hardware of a drone (102) is provided in the description of FIG. 2 and is not repeated herein.

In the illustrated embodiment, the drones (102) communicates with one another via low-bandwidth communications links (106a, 106b, 106c; collectively, 106). In the illustrated embodiment, the links (106) can comprise low speed, wireless communications links, although, in other embodiments, high-speed links may be used. For example, the links (106) may comprise short-range wireless links, including, but not limited to, vehicle-to-vehicle (V2V) links such as V-, W-, K-, or W-band links. Other types of networks may be used; however, the disclosure does not place a requirement that the links comprise high-speed links.

In the illustrated embodiment, the drones (102) may transmit various types of data among the links (106). In one embodiment, the drones (102) can be configured to transmit control information among the links (106). In one embodiment, the control information comprises data or instructions manipulating the operation of the drones (102). For example, the control information can include information causing the drones (102) to fly in a specified pattern. In one embodiment, the drones (102) additionally transmit inference outputs among the links (106). As used and described herein, inference outputs refer to the outputs of machine learning (ML) or artificial intelligence (AI) models executing on the drones (102). As one example, the inference outputs may comprise a classification of objects within an image captured by a camera (104) of a drone (102). As another example, the inference output may comprise a capture angle or a quality level of the image. As described, this data can be transmitted among the drones (102) via the links (106) as well as transmitted back to a control system (110). As described in more detail, the control system (110) receives inference outputs and controls the drones (102)

based on these inference outputs. Alternatively, or in conjunction with the preceding embodiments, the control system (110) can use the inference outputs to processing image data streamed by the drones to the control system (110).

In the illustrated embodiment, the drones (102) transmit data to the control system (110) via a communications link (108). In the illustrated embodiment, the link (108) comprises a network. In some embodiments, the link comprises a wide-area network such as a cellular or satellite network. As such, the link (108) may handle communications for all drones (102). In some embodiments, the link (108) comprises a high-speed data link. In some embodiments, the control system (110) is co-located with the drones (102). In some embodiments, the control system (110) can be situated in a vehicle or other movable device to travel with the drones (102). In other embodiments, the control system (110) is remote from the drones (102).

Figure 2:
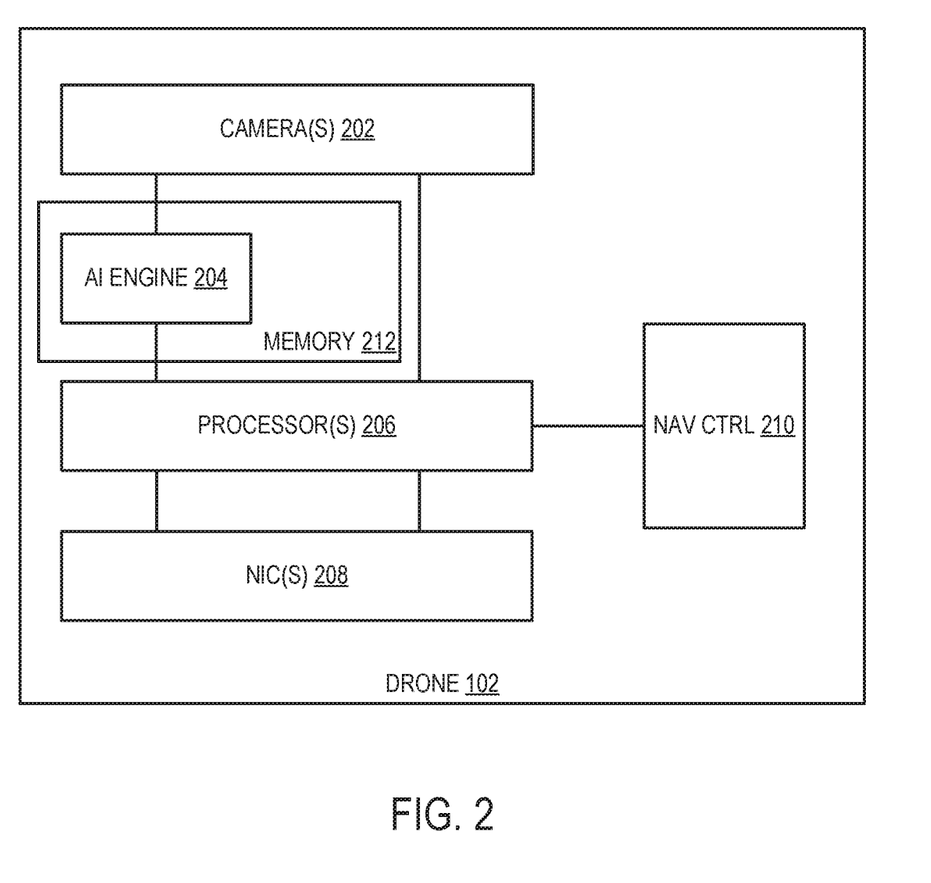
FIG. 2 is a block diagram illustrating the architecture of a drone according to some embodiments of the disclosure.

FIG. 2 is a block diagram illustrating the architecture of a drone according to some embodiments of the disclosure. In some embodiments, the drone depicted in FIG. 2 corresponds to the drones (102) depicted in FIG. 1.

In the illustrated embodiment, a drone (102) includes one or more cameras (202). In one embodiment, a camera (202) can comprise a separate device. That is, the camera (202) can comprise a digital camera device communicatively coupled to the drone (102) and physically tethered to the drone (102). In other embodiments, the camera (102) can comprise an integrated device. In one embodiment, an integrated camera comprises a digital camera device housed within the drone (102) and exposed to the atmosphere via a defined aperture. For example, a drone (102) can be equipped with a downward-facing glass aperture, and the camera (202) can be situated such that the lens of the camera (202) abuts the glass aperture. In other embodiments, the camera (202) comprises a charge-coupled device (CCD) or a similar type of imaging sensor. In some embodiments, CCDs or other such sensors may be implemented in conjunction with the foregoing embodiments.

As described above, the drone (102) operates the camera to capture images of an environment. As one example used throughout the description, the drone (102) captures aerial imagery, including an object of interest. An object of interest may include objects tracked by the drone, such as a vehicle or person. Alternatively, the object of interest may include natural phenomena such as natural disasters. No limitation is placed on the type of object of interest.

In the illustrated embodiment, cameras (202) are connected to a processor (206) and an AI engine (204). In some embodiments, the cameras (202) transmit image data simultaneously to the AI engine (204) and the processor (206). In other embodiments, the cameras (202) transmit image data to the AI engine (204), which brokers further transmission to the processor (206). In another embodiment, the cameras (202) transmit image data to the processor (206), which when brokers further transmission to the AI engine (204). In the illustrated embodiment, the AI engine (204) processes image data and generates inference outputs. The AI engine (204) then transmits these inference outputs to the processor (206) for further transmission or processing.

In the illustrated embodiment, the AI engine (204) is implemented in a memory device (212). In one embodiment, the memory device (212) comprises a non-volatile memory. Examples of non-volatile memory include flash memory, and memory units formed based on negative- and (NAND) logic gates, negative- or (NOR) logic gates, Phase-Change Memory (PCM), magnetic memory (MRAM), resistive random-access memory, crosspoint (XPoint) memory devices.

A crosspoint memory device can use transistor-less memory elements, each of which has a memory cell and a selector that are stacked together as a column. Memory element columns are connected via two lays of wires running in perpendicular directions, where wires of one lay run in one direction in the layer is located above the memory element columns, and wires of the other layer are in another direction and the layer located below the memory element columns. Each memory element can be individually selected at a cross point of one wire on each of the two layers. Crosspoint memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

In the illustrated embodiment, the AI engine (204) can store one or more predictive models (e.g., AI or ML models) that operate on image data. The AI engine (204) receives image frames, processes the frames using the model(s), and generates inference outputs. These and other operations are described in more detail herein.

As illustrated, the processor (206) receives data from either the AI engine (204) or the cameras (202). In some embodiments, the processor (206) receives data from both devices (202, 204). In one embodiment, if the processor (206) only receives data from the AI engine (204), the AI engine (204) can selectively process the image data to reduce the total amount of data transmitted to the processor. This reduction in data traffic, in turn, reduces the workload of the processors (206) and increases the responsiveness of the drone (102). As one example, the drone (102) may be operating to track an object of interest. In this example, the AI engine (204) can be configured with a model that detects and classifies objects in an image. If the AI engine (204) processes an image frame and determines that the image frame does not include a tracked object, the AI engine (204) can discard the image frame, which reduces the processing requirements of the processors (206). In some embodiments, the inference outputs generated by the AI engine (204) may include a confidence level. In this scenario, the AI engine (204) can operate as a gating threshold that only transmits images having a high confidence level. In this scenario, the processors (206) then performed a more computationally expensive prediction operation (e.g., using a more complicated AI/ML model) to generate a final inference output.

In the illustrated embodiment, the drone (102) includes one or more processors (206). In various embodiments, the processors (206) include a central processing unit (CPU), graphics processing unit (GPU), AI co-processor device, or other processing elements. In the illustrated embodiment, the processors (206) include multiple processors, although a single processor may be employed instead. The specific configuration of processing elements is not intended to be limited, and various permutations of processors may be employed.

In general, and as described in more detail herein, the processors (206) perform various operations relevant to the AI engine (204). The processors (206) can perform additional operations not relevant to the disclosure. For example, the processors (206) are communicatively coupled to a navigation control system (210) (referred to as a "nav system"). The nav system (210) can include various processing elements configured to control the drone (102). For example, the nav system (210) can include various microcontrollers for controlling rotors, power sources, and other mechanical elements of the drone (102). Further, the nav system (210) can include processing elements such as altimeters, speedometers, and generally any device for controlling the navigation of the drone (102). As illustrated, processors (206) transmits commands to the nav system (210) to control the operation of the drone (102). The processors (206) can select these instructions based on inference outputs of the AI engine (204) as well as external commands received from a control system (as described in FIG. 1, element 110) via network interface card (NIC) devices (208).

As described in more detail in the description of the flow diagrams below, the processors (206) perform various operations based on the outputs of the AI engine (204).

In a first mode operation, the processors (206) can use the outputs of the AI engine (204) to determine when to transmit image data to a control system. In one embodiment, the processors (206) make this decision based on whether the output of the AI engine (204) indicates that, for example, the image includes an object of interest. In this embodiment, the drone (102) can reduce the amount of network traffic over NICs (208). As described in the description of FIG. 1, NICs (208) can include short-range NICs as well as long-range NICs.

In another mode of operation, the processors (206) can use the output of the AI engine (204) to adjust the trajectory of the drone (102). For example, the AI engine (204) may output an orientation based on the recorded image. The processors (206) can then obtain orientation data from other drones and adjusts their position to maximize the image capture of an object of interest. In this embodiment, the processors (206) communicate with other drones to obtain the orientation data.

In another mode of operations, the processors (206) can use the output of the AI engine (204) to pre-process image data prior to sending the image data to a central server. For example, the processors (206) may crop an image to isolate an object of interest prior to transmitting the image to reduce bandwidth congestion. In another embodiment, the processors (206) can selectively transmit image data based on images captured by other drones. For example, if the central server performs stereoscopic image processing, the processors (206) may only transmit image data if another drone has not transmitted an image from the same or a similar angle. In this embodiment, the processors (206) coordinate the sending of images with other drones by identifying the angles of images captured by other drones and synchronizing the transmission of images with other drones.

Figure 3:
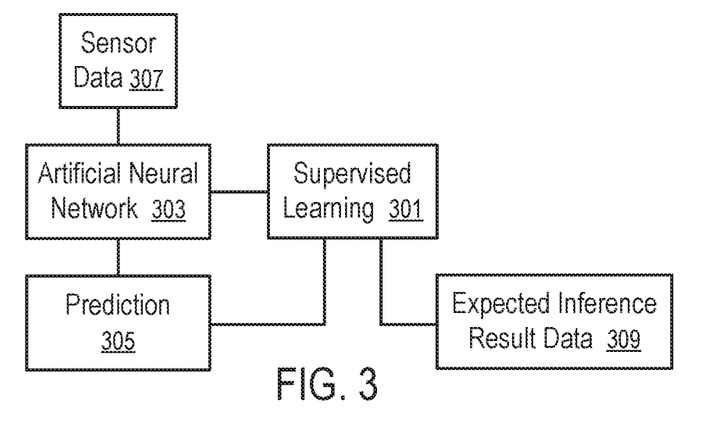
FIGS. 3-5 illustrate the training of artificial neural networks for prediction according to some embodiments.
Figure 4:
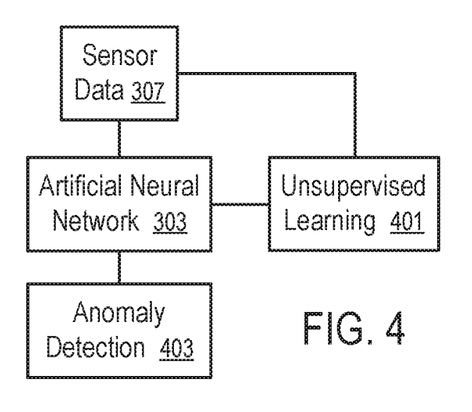
Figure 5:
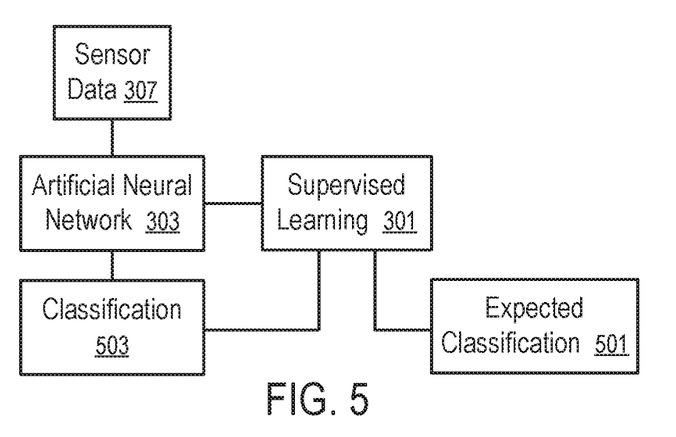

FIGS. 3-5 illustrate the training of artificial neural networks for prediction according to some embodiments.

In FIG. 3, a module (301) of supervised machine learning is used to train an artificial neural network (303) to minimize the differences between the prediction (305) generated from the sensor data (307) (for example, camera data) and the desired inference result data (309).

For example, the sensor data (307) can include an image showing an object; and the desired/expected inference result data (309) can identify an image region occupied by the object, a feature of the object, a classification of the object, an identity of the object, etc.

For example, the sensor data (307) can include an image captured by a camera of a drone (discussed previously); and the desired/expected inference result data (309) can include control inputs for the navigating the drone via, for example, a navigation control system (210).

The desired/expected inference result data (309) can be generated by a human operator. For example, the sensor data (307) can be used to construct a virtual reality demonstration of a situation encountered by the drone, including images from the camera showing an environment of the drone; and the desired/expected inference result data (309) can include responses generated by a human operator responsive to the virtual reality demonstration of the situation.

The supervised machine learning module (301) can adjust the artificial neural network (303) to reduce/minimize the difference between the prediction (305) generated based on the sensor data (307) and the desired/expected inference result data (309) generated by a human operator.

The supervised learning (301) of FIG. 3 can be applied in the central server (110) based on the sensor data of a population of vehicles and corresponding desired/expected inference result data (309) to generate a generic artificial neural network (ANN) for the population of the drones.

The supervised learning (301) of FIG. 3 can be applied in a drone using the sensor data of the drone and inference result data (309) to generate a customized/personalized ANN (303). For example, a generic ANN (303) can be initially used in the drone; and the sensor data of the drone and desired/expected inference result data (309) specific to the drone can be used to further train the ANN (303) of the vehicle for customization/personalization of the ANN (303) in the drone.

In FIG. 4, a module (401) of unsupervised machine learning is used to train or refine an artificial neural network (303) to facilitate anomaly detection (403). For example, anomaly detection (403) can be used to preserve the sensor data (307) associated with an anomaly for further analysis. In response to anomaly detection (403) in the drone, on-board processors can issue a read command to the camera to retrieve image data associated with the anomaly from the camera and store the retrieved image data in a data storage device. The image data associated with the anomaly can be temporarily preserved in the memory device (107) of the camera and loaded to the data storage device over a period of time using available communication bandwidth between the camera and the data storage device without impacting the normal operations of the drone.

When the drone is in the maintenance service facility, the image data (and other sensor data) associated with the anomaly can be retrieved from the data storage device to generate desired/expected inference result data (309) for further training of the ANN (303) using a supervised learning (301) of FIG. 3.

Optionally, a supervised machine learning (301) can be used to train the ANN (303), as illustrated in FIG. 5. The supervised learning (301) can be used to minimize the classification differences between the predictions (503) made using the ANN (303) according to the sensor data (307) and the expected classification (501).

Optionally, the integrated camera can be configured to accelerate the computations of a portion of the ANN (303) implemented via the AI engine.

For example, the AI engine can include a neural network accelerator specialized in performing at least part of the computations involving the ANN (303), such as a dot-product of vectors and tensors, multiply and accumulation operations, etc. Optionally, some ANN processing not involving the images generated by the image sensor (109) can also be performed in the integrated camera (e.g., to reduce the computation load on the processors of the drone).

The computations configured in the integrated camera can be used to reduce the amount of data to be transmitted to the processor(s) to use or apply the ANN (303) and/or reduce the computation tasks of the processor(s) in evaluating the outputs of the ANN (303) and/or in training the ANN (303). Such an arrangement can result in faster output from the integrated camera and/or lower energy usage since the data would not have to be moved in and out of the integrated camera to a dedicated, standalone neural network accelerator. The computation capability of the integrated camera in processing data related to the ANN (303) enables the processors of the drone to have computational resources and communication bandwidth for mission-critical tasks.

Figure 6:
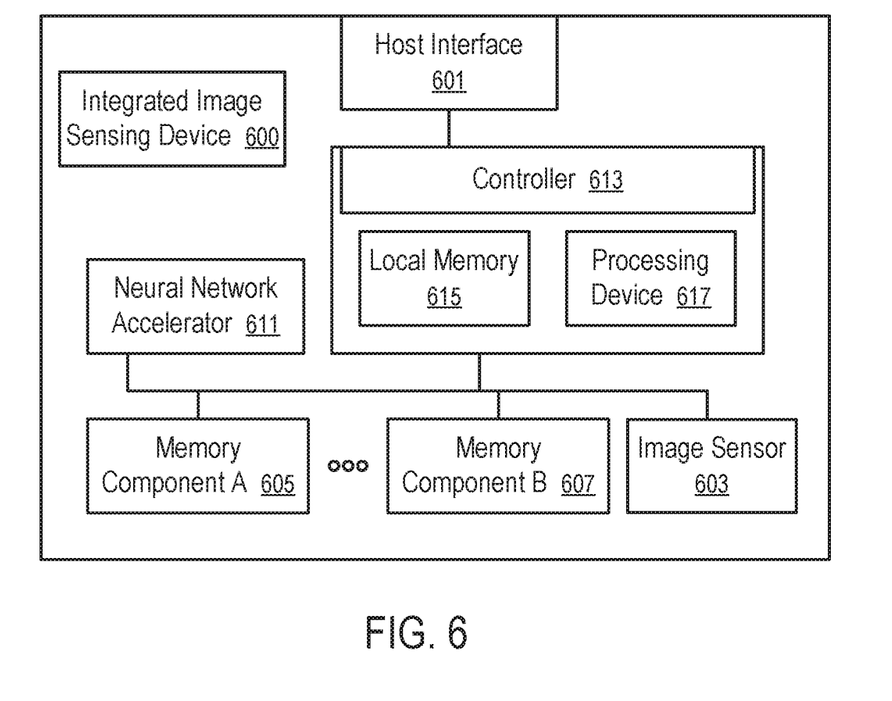
FIG. 6 shows an integrated camera with a neural network accelerator according to one embodiment of the disclosure.

FIG. 6 shows an integrated camera with a neural network accelerator (611) according to one embodiment of the disclosure. For example, the integrated camera of FIG. 6 can be used to implement the camera of the drone illustrated in FIG. 1 or 2.

In FIG. 6, the integrated camera (600) has a host interface (601) configured to communicate with a local processor or a central server. For example, the communication between the local processor and the host interface (601) can be, at least in part, in accordance with a communication protocol for a Peripheral Component Interconnect Express (PCIe) bus, a Serial Advanced Technology Attachment (SATA) bus, a Universal Serial Bus (USB) bus, and/or a Storage Area Network (SAN).

For example, the host interface (601) can be configured to be similar to a host interface of a data storage device.

For example, the central server can communicate with the host interface (601) to retrieve inference results generated by the integrated camera (600) from the images from the camera, instead of the images, to reduce the data traffic going through the host interface (601).

Optionally, the host interface (601) can be further used to receive, in the camera, sensor data (307) generated by other sensors of the drone; and the sensor data (307) and the images from the image sensor (603) are combined in a portion of the ANN (303) that is implemented in the integrated camera (600) to generate inference results.

In FIG. 6, each of the memory components (605 to 607) can be a memory integrated circuit configured to store data. The integrated circuit dies of the memory components (605 to 607) can be stacked to the back of the image sensor (603), and through-silicon vias between the image sensor (603) and the dies of the memory components (605 to 607) can be used to provide high communication bandwidth for storing the images generated by the image sensor (603) into at least some of the memory components (605 to 607) for processing by the controller (613) and/or the neural network accelerator (611). For example, different sections of the image sensor (603) can store image data to different memory components (605 to 607), or different sections of a memory component (e.g., 605 or 607), using through-silicon vias.

The neural network accelerator (611) and the controller (613) can be implemented via logic circuits formed on one or more integrated circuit dies that are further stacked on the integrated circuit dies of the memory components (605 to 607). Through-silicon vias between the integrated circuit die(s) of the neural network accelerator (611) and the controller (613) and the dies of the memory components (605 to 607) can be used to provide high communication bandwidth for processing the images stored in the memory components (605 to 607) to generate inference results. The inference results can be stored in the local memory (615) of the controller (613) and/or some of the memory components (605 to 607) for retrieval by the host system (104), such as the processors of the drone. For example, different memory components (605 to 607), or different sections of a memory component (e.g., 605 or 607), can use through-silicon vias to facilitate parallel access for different portions of the neural network accelerator, the controller (613), and the image sensor (603).

In general, some memory integrated circuits are volatile and require power to maintain the stored data; and some memory integrated circuits are non-volatile and can retain the stored data even when not powered. The memory components (605 to 607) can include volatile memory and/or non-volatile memory. The memory components (605 to 607) can implement different types of memory or the same type of memory.

The integrated camera (600) can have a controller (613) that includes volatile local memory (615) and at least one processing device (617).

The local memory of the controller (613) can be an embedded memory configured to store instructions for performing various processes, operations, logic flows, and routines that control operation of the processing device (617), including handling communications between the integrated camera (600) and the processor(s) of the drone, and other functions described herein. Optionally, the local memory (613) of the controller (613) can include Read-Only Memory (ROM) for storing micro-code and/or memory registers storing, e.g., memory pointers, fetched data, etc., and/or volatile memory, such as Dynamic Random-Access Memory (DRAM) and Static Random-Access Memory (SRAM).

In FIG. 6, the integrated camera (600) includes a neural network accelerator (611) coupled to the controller (613) and/or the memory components (605 to 607).

For example, the neural network accelerator (611) can be configured to perform matrix arithmetic computations more efficiently than the processing device (617) of the controller (613). The computations involving ANN (303) have matrix multiplication and accumulation operations, which can be computational intensive for a generic processor. Using the neural network accelerator (611) to perform the matrix arithmetic computations can reduce the data to be transmitted to the processor(s) of the drone and reduce the computation workload for the processor(s).

When the ANN (303) includes a Spiking Neural Network (SNN), the simulation of the differential equation(s) for controlling the activation level of SNN neurons can be computationally intensive for a generic processor. Optionally, the neural network accelerator (611) can use specialized hardware to simulate the differential equation(s) and thus improve the computational efficiency in implementing the SNN.

In some implementations, the neural network accelerator (611) is an integrated circuit device separate from the controller (613) and/or the memory components (605 to 607). Alternatively, or in combination, a neural network accelerator (611) is integrated with the controller (613) in an integrated circuit die. Alternatively, or in combination, a portion of the neural network accelerator (611) can be integrated on the integrated circuit die(s) of at least one of the memory components (605 to 607), as illustrated in FIG. 7.

Figure 7:
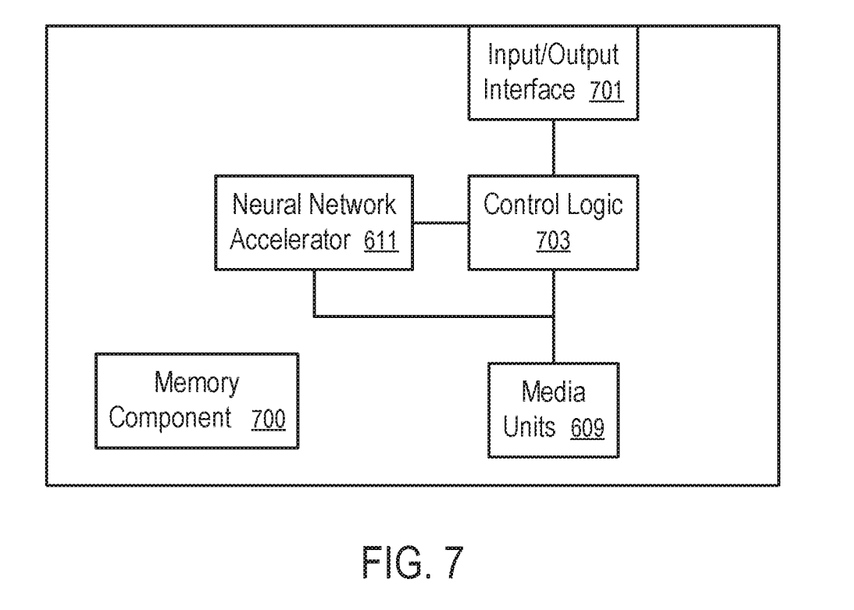
FIG. 7 shows a memory component to accelerate neural network computations according to one embodiment.

FIG. 7 shows a memory component (700) to accelerate neural network computations according to one embodiment. For example, each or some of the memory components (605 to 607) in FIG. 6 can be implemented using a memory component (700) of FIG. 7.

In FIG. 7, the memory component (700) can be formed on an integrated circuit die. An input/output (I/O) interface (701) of the memory component (700) is configured to process input/output signals for the memory component (700). For example, the input/output signals can include address signals to specify locations in the media units (609) and data signals representing data to be written in the media units (609) at the locations specified via the address signals, or data retrieved from the locations in the media units (609).

In FIG. 7, a neural network accelerator (611) is coupled with the control logic (703) and/or the media units (609) to perform computations that are used in the evaluation of the output of a portion of an ANN (303) and/or in the training of the ANN (303).

For example, the input/output interface (701) can receive addresses that identify matrices that are stored in the media units and that are to be operated upon via the neural network accelerator. The memory component (700) can provide the computation results of the neural network accelerator (611) as the output data responsive to the addresses, store the output data in a buffer for further operations, store the output data into a location in the media units (609) specified via the address signals. Thus, the computations performed by the neural network accelerator (611) can be within the memory component (700), which is close to the media units (609) in which the matrix data is stored.

For example, the state data of SNN neurons can be stored in the media units (609) according to a predetermined pattern. The neural network accelerator (611) can automatically update the states of the SNN neurons according to the differential equation(s) for controlling the activation level of SNN neurons over time. Optionally, the neural network accelerator (611) is configured to process the spiking of neurons in the neural network. Alternatively, the neural network accelerator (611) of the integrated camera (600) and/or the processor(s) can be configured to process the spiking of neurons and/or accumulation of inputs to the SNN.

For example, the image sensor (603) generates images at a predetermined frequency. Each image is stored in the memory components (605 to 607) in a cyclic way, where the newest image writes over the oldest image. The memory components (605 to 607) further store a portion of ANN (303) of the drone responsible for the processing of the images from the image sensor (603). The controller (613) processes the images in the memory components (605 to 607) according to the portion of ANN (303) to generate inference results. The inference results are stored in the memory components (605 to 607) and/or in the local memory (615) of the controller (613) for reading by the host system (104), such as the processors of the drone.

Optionally, the integrated camera (600) further receives a sensor data stream from at least one sensor configured on the drone and generate the inference results based on the sensor data stream and the images from the image sensor (603) according to the portion of ANN (303) stored in the memory components (605 to 607).

A neural network accelerator (611) configured within the integrated camera performs at least a portion of computations based on an artificial neural network (303), the images from the image sensor (603), and the sensor data stream.

Optionally, the neural network accelerator (611) can be configured on an integrated circuit die that is separate from a controller (613) and/or separate from the memory components (605 to 607).

Optionally, the neural network accelerator (611) can be configured on an integrated circuit die that includes a controller (613) of the integrated camera, or memory component (603, 605 or 607) of the integrated camera.

The neural network accelerator (611) can be configured to perform computations, such as matrix arithmetic computations for ANN and/or differential equation simulations for SNN, using data stored in the integrated camera.

Examples of the matrix arithmetic computations include matrix multiplication and accumulation operations. After a computation to generate a result of the matrix arithmetic computations using data stored in the integrated camera, the neural network accelerator (611) can provide the result as the output of the integrated camera in data retrieval operations (e.g., in response to a read command). Alternatively, or in combination, the result of the matrix arithmetic computation can be buffered in the integrated camera as operand for a next matrix computation performed in combination with a matrix of data retrieved from the non-volatile memory via a read command received in the host interface (601).

When the ANN (303) includes a Spiking Neural Network (SNN), the neural network accelerator (611) can be configured to simulate a differential equation controlling activation levels of neurons in the Spiking Neural Network (SNN). Optionally, the memory component (700) is configured to store states of the neurons in the spiking neural network according to a predetermined pattern; and the neural network accelerator is configured to automatically update the states of the neurons over time according to the differential equation. For example, the neural network accelerator (611) can be configured to train the Spiking Neural Network (SNN) via unsupervised machine learning to detect an anomaly.

The computations performed by the neural network accelerator (611), according to an ANN (303), involve different types of data that have different patterns of usages of the integrated camera.

For example, making a prediction using the ANN (303) includes the use of data specifying the model of the ANN (303), input data provided to the artificial neurons, and output data generated by the artificial neurons.

The memory capacity of the integrated camera can be partitioned into different portions for the different types of ANN-related data. The different portions can be separately configured to optimize the access and storage of the corresponding data according to their patterns of usages by the neural network accelerator (611) and/or the processor(s) of the processors in which the integrated camera is configured.

The model of the ANN (303) can include the parameters specifying the static attributes of individual artificial neurons in the ANN (303) and the neuron connectivity in the ANN (303). The model data of the ANN (303) is static and does not change during the prediction calculation made using the ANN (303). Thus, the usage pattern of the model data is mostly read. However, the model data of the ANN (303) can change when an updated ANN (303) is installed. For example, the drone can download an updated ANN (303) from the central server to the integrated camera of the drone to update its prediction capability. The model data of the ANN (303) can also change during or after the training of the ANN (303) using a machine learning technique. Some embodiments configure a memory separate partition or region of the integrated camera to store the model data, where the partition or region is operated according to configuration parameters that optimize the memory units for the specific usage patterns of the model data (e.g., mostly read, infrequent update). For example, when the memory units are implemented using a flash memory based on NAND logic gates, the memory units in the ANN model partition/region can be configured to operate in a Multi- Level Cell (MLC) mode, a Triple Level Cell (TLC) mode, or a Quad-Level Cell (QLC) mode, wherein each memory cells stores two, three, or four bits for increased storage capability.

Input data provided to the artificial neurons in the ANN (303) can include external inputs and internal inputs. The external inputs are generated typically by the sensors of the drone but not by artificial neurons in the ANN (303). The external inputs can be saved in a cyclic fashion so that the input data of the most recent time period of a predetermined length of driving can be found in the integrated camera. Thus, some embodiments configure a separate memory partition or region of the integrated camera to store the external input data, where the partition or region is operated according to configuration parameters that optimize the memory units for the storage pattern of the external input data (e.g., enhanced endurance, cyclic overwrite). For example, when the memory units are implemented using a flash memory based on NAND logic gates, the memory units in the ANN input partition/region can be configured to operate in a Single-Level Cell (SLC) mode, where each memory cell stores one bit of data for improved endurance in cyclic overwriting operations.

In some implementations, artificial neurons can have state variables that change over time in response to inputs during prediction calculations. For example, the activation level of a spiking neuron can change over time and is considered a dynamic state variable of the spiking neuron. In some implementations, such state variable data of artificial neurons has a similar storage usage pattern as the external input data; and thus, the state variable data can be stored in the partition or region configured for the external input data. In other implementations, the state variable data of artificial neurons are kept in a buffer and stored less frequently than the external inputs; and thus, another partition/region can be configured for storing the dynamic state variable data of artificial neurons.

Output data generated by the artificial neurons in the ANN (303) can be buffered for further access by the neural network accelerator (611) and/or the processor(s) of the processors. The output data can include external outputs and internal outputs. The external inputs are generated by artificial neurons as the output from the ANN (303), such as the results of classifications or predictions made by the ANN (303). The output of the ANN (303) is typically further processed by the processor(s) of the processors. The external inputs may be saved periodically (e.g., in a way similar to the storing of the state variable data). The internal outputs and/or some of the external outputs can be internal inputs to artificial neurons in the ANN (303). In general, it may not be necessary to store the internal outputs from the buffer of the data storage device to the memory components. In some implementations, when the buffer capability of the integrated camera is insufficient to hold the entire state variable data and/or the internal outputs, the integrated camera can use a swap partition/region to extend the capacity of the buffer. The swap partition/region can be configured for optimized random access and for improved endurance.

External outputs and/or dynamic states of neurons can be saved in a separate output partition or region, in a cyclic way so that the external output data and/or dynamic states of the neurons can be periodically stored, and the most recent sets of the external outputs and/or dynamic states can be found in the integrated camera. External outputs and/or dynamic states of neurons can be stored selectively since some of such data can be re-generated by the ANN from the external inputs stored in the input partition or region. Preferably, the output partition or region is configured to store one or more sets of external outputs and/or dynamic states that cannot be created from the external inputs stored in the input partition or region. In storing data in a cyclic way in an input/output partition or region, the oldest stored data sets are erased to make rooms for the most recent data sets. The ANN input/output partition/region can be configured for an optimized sequential write stream for copying data from the buffer of the data storage device into the memory units in the memory components of the data storage device.

Figure 8:
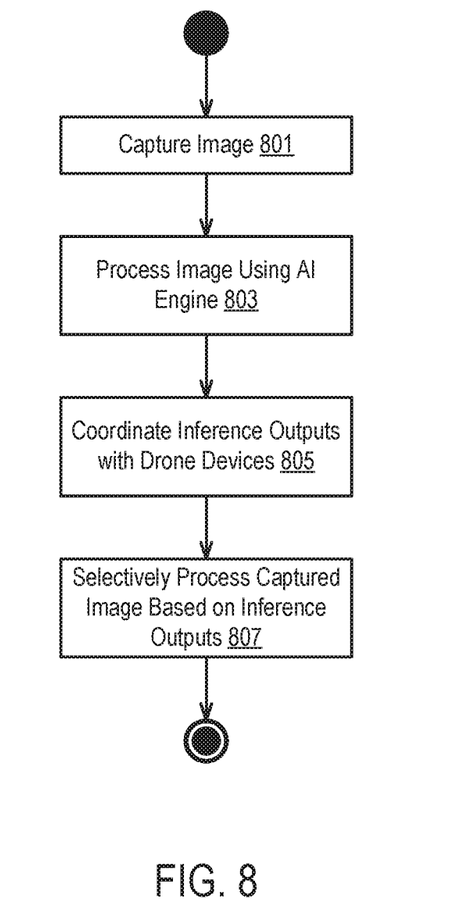
FIG. 8 is a flow diagram illustrating a method for selectively transmitting image data from a drone network according to some embodiments of the disclosure.

FIG. 8 is a flow diagram illustrating a method for selectively transmitting image data from a drone network according to some embodiments of the disclosure.

In block 801, the method captures an image.

In the illustrated embodiment, capturing an image comprises capturing an image (or frame of video) using a camera device installed on a drone. In some embodiments, the image comprises a rectangular or square image comprising a matrix of pixels, each having various values such as color, luminance, saturation, etc.

In some embodiments, the image captures an area of interest. In some embodiments, this area of interest comprises land or sea below the drone while the drone is operating. Additionally, in some embodiments, the area of interest may or may not include an object of interest. As used herein, an object of interest generally refers to any object appearing in the area of interest. In some embodiments, the object of interest comprises a pre-defined object set in the memory of the drone. For example, a user can configure drone executing the method to detect vehicles or, in some cases, a specific type of vehicle. In this scenario, the object of interest comprises vehicles or, alternatively, a specific type of vehicle. In general, an object of interest can be defined by defining an AI/ML model that identifies an object of interest. Thus, in some embodiments, the method can be configured to detect any object of interest that can be modeled using an AI/ML model.

In block 803, the method processes the image using an AI engine.

In one embodiment, the AI engine may be implemented as an AI coprocessor integrated into a memory device. In some embodiments, this memory device can be combined with a camera that recorded the images in block 801 to form a single integrated device. In the illustrated embodiment, the method processes images using an AI/ML model. In one embodiment, the AI/ML model comprises an object detection model. In other embodiments, the AI/ML model comprises an angle detection model. The outputs of the AI/ML model comprise inference outputs, and the format of the inference outputs depends on the type of model used. If an object detection model is used, the inference outputs may comprise a bounding box specifying where the desired image is located. As described above, this desired image may be set as a feature of the model. If an angle detection model is used, the inference outputs may include the position of the camera relative to a fixed marker. In some embodiments, multiple models may be employed. Thus, in the foregoing examples, the method may first detect that an object of interest was detected and then use an angle detection model to compute the camera angle of the device relative to the object of interest. In all examples, the AI engine may also generate a confidence level indicating the strength of the inference output. That is, the confidence level may indicate how likely the inference output is correct.

In block 805, the method coordinates inference outputs with one or more additional drone devices.

In a single drone system, block 805 is optional. However, in a multi-drone system, the method transmits inference outputs among the network of drone devices using a low-speed over-the-air network. Continuing the preceding examples, if the AI/ML model detects objects of interest, the inference output may comprise a region including the object of interest (or a flag indicating that the object was not detected). In some embodiments, the inference outputs may further include a confidence level and/or a quality level. The drone device generating this inference output broadcasts the inference output to at least one other drone, and, conversely, the drone receives an inference output from the receiving drone. Thus, after block 805, each drone has the inference outputs of all other drones. Thus, at the end of block 805, a single drone can compare its inference output to the inference outputs of another drone.

In block 807, the method selectively processes the captured image based on inference outputs generated by a network of drones. In block 807, the method may perform one more of the following operations.

A drone may determine whether to send the analyzed image to a central server based on comparing the inference outputs. If no other drone reported capturing the object of interest, the drone could transmit the image if the object was detected. Alternatively, the method may determine if its confidence level was the highest among another inference output, indicating a detected object. If the method determines that it has the highest confidence value, it may transmit its image. If it determines it does not have the highest confidence value, it may discard the image. Alternatively, the method may transmit the image to a central server if it determines if its confidence level is in the top N images, where N is an integer configured as part of the method. Alternatively, or in conjunction with the foregoing, the inference outputs may include a detected angle or position. The method may factor these values when determining whether to send images. For example, the method may group inference outputs by position or angle to avoid sending duplicative data.

In either of the above methods, the method may also further process the image prior to transmittal. For example, the method can crop the image based on the boundaries detected by the AI/ML model. As will be described in the following description of FIG. 9, the drones implementing the method of FIG. 8 may further be controlled by a central server that instructs the drones based on the inference outputs and/or images.

Figure 9:
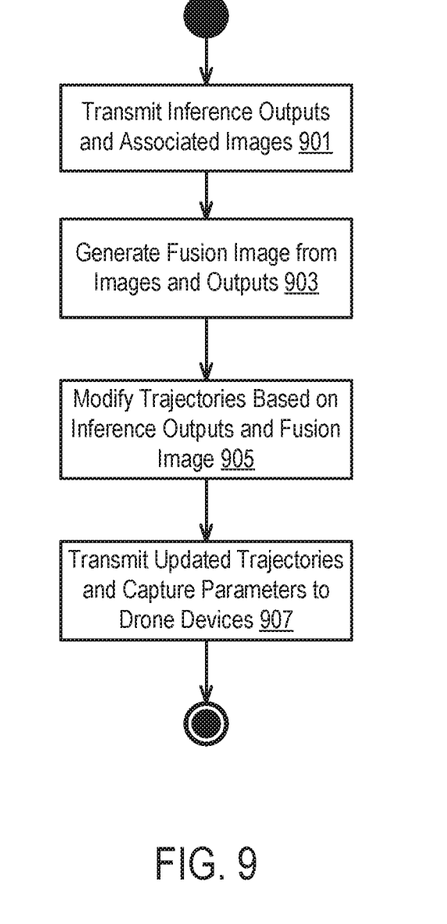
FIG. 9 is a flow diagram illustrating a method for adjusting the trajectory of a drone network based on the analysis of captured images according to some embodiments of the disclosure.

FIG. 9 is a flow diagram illustrating a method for adjusting the trajectory of a drone network based on the analysis of captured images according to some embodiments of the disclosure.

In block 901, the method transmits inference outputs among a plurality of drones and from a plurality of drones to a central server. Additionally, in block 901, the method transmits image data from the plurality of drones to the central server.

In some embodiments, block 901 overlaps partially with block 805 of FIG. 8. That is, in both steps, a network of drones transmits inference outputs among the drones. That portion of the disclosure is not repeated herein.

In addition to intra-drone transmittal (described above), one or more drones may transmit the inference outputs and/or image data to a central server. In one embodiment, each drone transmits inference outputs as they are generated. In some embodiments, drones may only transmit image data upon determining that the inference output indicates that the inference output associated with an image data meets a predefined condition (e.g., its confidence level is above a pre-configured threshold).

In block 903, the method generates a fusion image from the plurality of images and inference outputs.

In one embodiment, the images received in block 901 comprise images of an object of interest from multiple angles. As described above, such images are associated with inference outputs that satisfy a predefined condition (e.g., having a high confidence level of including an object of interest). In one embodiment, the images additionally include a perspective or angle value indicating the orientation of the image. Using the inference outputs and metadata, the central server "stitches" the images together to generate a fusion image. In one embodiment, the fusion image comprises a stereoscopic image of the object of interest comprising the individual images recorded by the drones.

In another embodiment, image data is processed through a partial AI model consisting of an input layer and one or more hidden layers (but no output layer) to generate an intermediate result. That intermediate result is transmitted to another drone or a central server and combined with second image data (or second intermediate result) from the another drone to generate a prediction result. In some examples, the last hidden layer of the AI model can be a "bottle neck layer" with significantly few dimensions compared to the input layer or the other hidden layers to generate a compressed intermediate result that would be easier to transmit.

In block 905, the method modifies trajectories of the drones based on the inference outputs and the fusion image.

In one embodiment, the method can further analyze the processing of the individual images. In some embodiments, the method may extrapolate beyond the boundaries of the images to form the stereoscopic images. In some embodiments, this extrapolation can be performed using machine learning models that predict the edges of an image. In some embodiments, the method analyzes the images to determine if the stereoscopic image can be formed using the input images. If so, the method flags the fusion image as being successfully created.

In other embodiments, the method may detect portions of the resulting image that include no image data due to a lack of image capture. In this scenario, the method can identify the drones closest to the "gap" in image data and retrieve the trajectory of the drone. The method can then analyze the position of the object of interest an adjust the trajectory of the drone to fill the "gap" in the fusion image. Block 905 can be repeated to continuously refine the trajectories of a drone network.

In some embodiments, the method may additionally adjust the capture parameters of the drones. Capture parameters include, but are not limited to, exposure time, capture frequency, camera angle, and other factors affecting the operation of a camera. Similar to the foregoing, the capture parameters may be adjusted based on analyzing the quality of the fusion image.

In block 907, the method transmits the updated trajectories and capture parameters to the drone network. As described above, the trajectories and capture parameters can be transmitted to the drone network via a WAN. The drone devices receive this data and can modify their trajectories and capture parameters accordingly, as described previously.

The present disclosure includes methods and apparatuses which perform the methods described above, including data processing systems which perform these methods, and computer-readable media containing instructions which when executed on data processing systems cause the systems to perform these methods.

A typical data processing system may include an interconnect (e.g., bus and system core logic), which interconnects a microprocessor(s) and memory. The microprocessor is typically coupled to a cache memory device.

The interconnect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras, and other devices known in the art. In one embodiment, when the data processing system is a server system, some of the I/O devices, such as printers, scanners, mice, and/or keyboards, are optional.

The interconnect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic, optical drive, an optical drive (e.g., a DVD RAM), or another type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special-purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine-readable medium (e.g., 700) can be used to store software and data which, when executed by a data processing system causes the system to perform various methods (e.g., the methods of FIGS. 8 and 9). The executable software and data may be stored in various places including for example ROM, volatile RAM, non-volatile memory and/or cache (e.g., 615, 605, 607, 700). Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in the same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to non-transitory, recordable and non-recordable type media such as volatile and non-volatile memory devices, Read-Only Memory (ROM), Random Access Memory (RAM), flash memory devices, floppy, and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine-readable medium and are not configured to store instructions.

In general, a machine-readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure do not necessarily reference the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
    capturing a first image by a camera installed on a first drone device;
    processing the first image using an artificial intelligence (AI) engine embedded in the first drone device, the processing comprising generating a first inference output by identifying that the first image includes an object of interest;
    transmitting the first inference output to a second drone device;
    receiving a second inference output from the second drone device, the second inference output associated with a second image captured by the second drone device;
    transmitting the first image to a processor based on the first inference output and second interference output;
    discarding the first image if the first inference output indicates the first image does not include the object of interest; and
    instructing the second drone device to transmit the second image if the second inference output indicates that the second image includes the object of interest.

2. The method of claim 1, the identifying that the first image includes an object of interest comprising generating a confidence level that the first image includes the object of interest.

3. The method of claim 1, the transmitting the first image to the processor comprising transmitting the first image if the first inference output indicates that the first image include the object of interest and the second inference output indicates that the second image does not include the object of interest.

4. The method of claim 1, the processing of the first image using the AI engine comprising processing the first image in a memory device of the first drone device, the memory device physically separate from the processor of the first drone device.

5. The method of claim 1, further comprising adjusting a trajectory of the first drone device based on the first inference output and second inference output.

6. The method of claim 1, further comprising generating a fusion vision of the object of interest based on the first inference output or the second inference output.

7. A non-transitory computer-readable storage medium for tangibly storing computer program instructions capable of being executed by a computer processor, the computer program instructions defining steps of:
    capturing a first image by a camera installed on a first drone device;
    processing the first image using an artificial intelligence (AI) engine embedded in the first drone device, the processing comprising generating a first inference output by identifying that the first image includes an object of interest;
    transmitting the first inference output to a second drone device;
    receiving a second inference output from the second drone device, the second inference output associated with a second image captured by the second drone device;
    transmitting the first image to a processor based on the first inference output and second interference output;
    discarding the first image if the first inference output indicates the first image does not include the object of interest; and
    instructing the second drone device to transmit the second image if the second inference output indicates that the second image includes the object of interest.

8. The computer-readable storage medium of claim 7, the identifying that the first image includes an object of interest comprising generating a confidence level that the first image includes the object of interest.

9. The computer-readable storage medium of claim 7, the transmitting the first image to the processor comprising transmitting the first image if the first inference output indicates that the first image include the object of interest and the second inference output indicates that the second image does not include the object of interest.

10. The computer-readable storage medium of claim 7, the processing of the first image using the AI engine comprising processing the first image in a memory device of the first drone device, the memory device physically separate from the processor of the first drone device.

11. The computer-readable storage medium of claim 7, the instructions further define the step of adjusting a trajectory of the first drone device based on the first inference output and second inference output.

12. The computer-readable storage medium of claim 7, the instructions further define the step of generating a fusion vision of the object of interest based on the first inference output or the second inference output.

13. An apparatus comprising:
    a camera device configured to capture a first image by a camera;
    an artificial intelligence (AI) engine configured to process the first image using, the processing comprising generating a first inference output by identifying that the first image includes an object of interest; and
    a processor configured to:
        transmit the first inference output to a second drone device,
        receive a second inference output from the second drone device, the second inference output associated with a second image captured by the second drone device,
        process the first image based on the first inference output and second interference output,
        discard the first image if the first inference output indicates the first image does not include the object of interest, and
        instruct the second drone device to transmit the second image if the second inference output indicates that the second image includes the object of interest.

14. The apparatus of claim 13, the AI engine further configured to process the first image in a memory device, the memory device physically separate from the processor.

15. The apparatus of claim 13, the processor further configured to adjust a trajectory of the apparatus based on the first inference output and second inference output.

* * * * *